Nov. 2, 1971   G. B. STILLWAGON, JR   3,616,827
NON-MAGNETIC FASTENER PICK-UP AND DRIVING TOOL
Filed Aug. 11, 1969
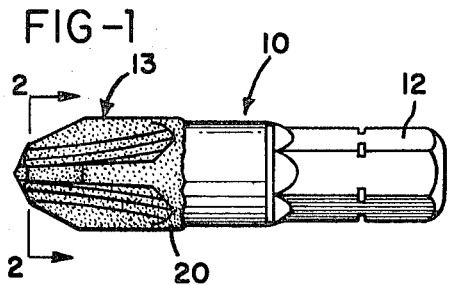
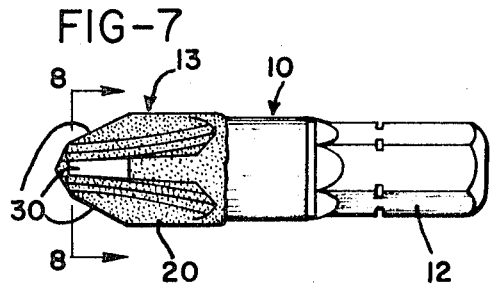
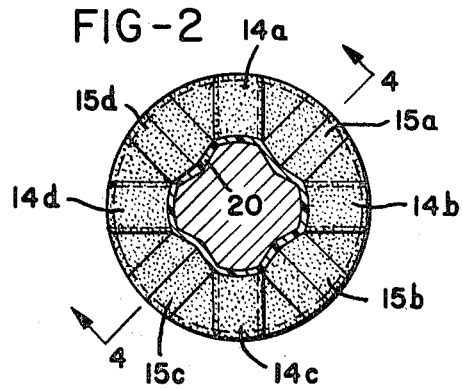
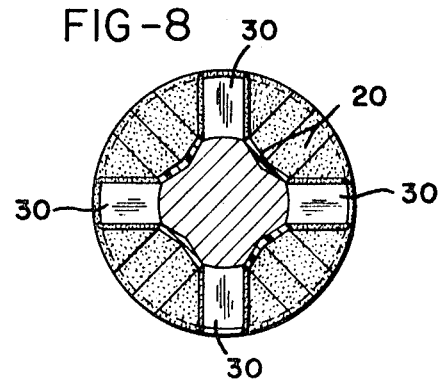
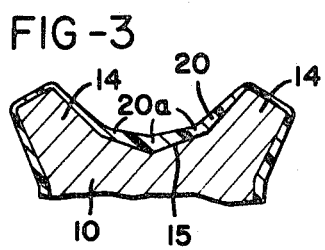
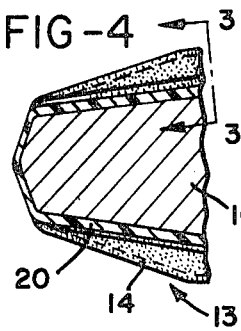
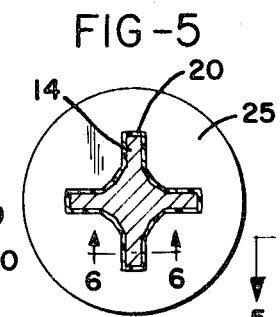
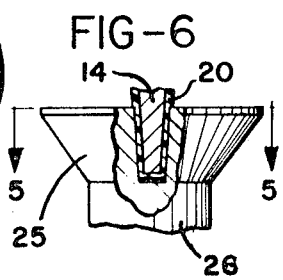
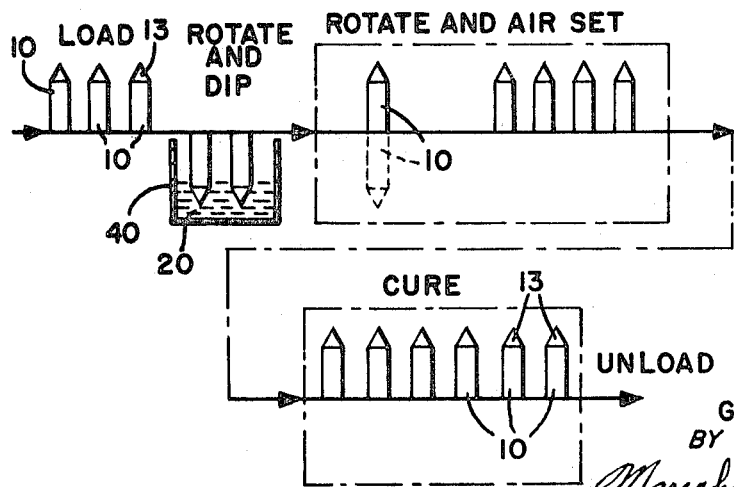
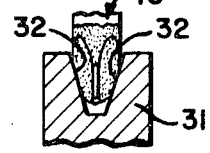
INVENTOR
GEORGE B. STILLWAGON, JR.
BY Marechal, Biebel, French & Bugg
ATTORNEYS United States Patent Office 3,616,827
Patented Nov. 2, 1971

3,616,827
NON-MAGNETIC FASTENER PICK-UP AND
DRIVING TOOL
George B. Stillwagon, Jr., Dayton, Ohio, assignor to
Gardner-Denver Company, Dayton, Ohio
Filed Aug. 11, 1969, Ser. No. 848,876
Int. Cl. B25b 15/00, 23/08
U.S. Cl. 145—50 D
6 Claims

ABSTRACT OF THE DISCLOSURE

Screwdriver bits employ a thin coating of an elastomeric material whose outer exposed surface is non-tacky, e.g., a cured material, which does not interfere with or detract from the normal use of the bits but which form a slight interference fit when inserted into the recess of a threaded fastener for retaining the fastener on the end of the bit prior to driving. One embodiment shows the coating entirely covering the end of the bit and in another embodiment the coating is excluded from the radially outward faces of the driving wings so as not to interfere with the insertion of the bit in a recess.

BACKGROUND OF THE INVENTION

Both magnetic and mechanical devices are known for temporarily attached threaded fasteners on the ends of a driving tool, such as a screwdriver, socket driver and the like. Magnetic pick-up tools have been preferred where the fastener is formed of magnetically retractable material, which includes most of the steel fasteners, and examples of particularly useful magnetic pick-up tools are shown in Stillwagon 3,392,767 issued July 16, 1968.

The pick-up function of magnetic pick-up tools is, of course, ineffective when using fasteners formed of aluminum, brass, stainless steel or other essentially non-magnetic material. In this case, other arrangements have been employed for temporarily retaining a fastener on the end of the driver, including clips, detents, wires and springs which physically engage and retain the fastener. Such arrangements frequently require the special attention of the operator and sometimes require the use of both hands in order to insert the fastener in proper relation to the fastener retaining attachment or device. They seldom lend themselves to convenient use with multiple bits and screwdrivers for use with cruciform-slotted recesses, generally known as ""Phillips" drivers. Such arrangements are usually such that they detract from the torsional strength of the driver and thus limit its usefulness. In most cases the strength is so affected that such drivers can only be used to start the screws, with the remaining driving being done by a conventional driver or bit.

SUMMARY OF THE INVENTION

The present invention relates to drivers for fasteners having driver-receiving recesses, and in the preferred embodiment, the invention is shown as being applied to screwdriver bits. A thin coating or layer of deformable or elastomeric material is applied to the driver at the driving end thereof to form an adherent coating whose exposed surface is non-tacky. The coating is so proportioned as to form a slight interference fit or a gripping engagement with the walls of the recess. The engagement which is provided is sufficient to retain the fastener in aligned engagement on the end of the driver for driving. The strength of the tool remains unaffected.

In further explanation, there is inherently some clearance space between the driver and the recess in commercially produced fasteners. In spite of attempts in design and in construction to achieve flat-to-flat driving contact, it is known that at best there is achieved only limited area contact between the driving and the driven surfaces. Often only point or line contact is achieved due to a number of factors, including the necessity for providing some tolerances and clearance between the parts, the wearing of the dies from which the parts are made, and the fall-away of material of the fastener during the punching process in forming the recess. Therefore, in actual practice, there are unavoidable voids and gaps between the respective surfaces of the driving and the driven members. These voids occur at the driving faces, at the roots, and at the non-driving or retracting surfaces, in the case of a cruciform recess. Such clearances may vary anywhere from a fraction of a thousandth of an inch on quite small drivers up to several thousandths of an inch on larger units. The thin, elastomeric-like coating which is applied to the driving end of the tool provides a non-tacky deformable layer which may thus form a slight interference fit with the recess, occupying the above-defined clearance spaces, and the gripping effect achieved is sufficient to retain the fastener in place prior to driving.

An important discovery in connection with the present invention is that the coating does not adversely affect the operation of the driver. In the case of screwdriver bits, the driving contact, as previously described, is only at limited points or areas at best and, while the coating may thus become worn off at these points, the retentive effect of the coating is not destroyed.

Preferably, a coating material is employed in which the thickness can be controlled with reasonable accuracy, and which forms a good bond with the material of the driver. One such suitable material is a resilient flexible elastomeric polymer which may be applied by dipping, for example, to the end of the bit and which is then cured to form a tough coating, having a high resistance to abrasion, and also having good adhesion to the metal of the bit. Nevertheless, this material is yieldable when the working end of the bit is inserted within the recess to give a snug fit which retains the fastener in place for driving.

An important object of this invention is the provision of a driver tool on which is coated, bonded, or otherwise formed, a deformable or elastomeric layer or coating of material on one or more of the surfaces adapted to be received within a recessed fastener for forming an interference fit with the fastener, thus retaining the fastener in the manner outlined above.

Another object of the invention is to provide an improved screwdriver bit for driving screws with one or more slotted recesses which includes a coating of deformable or elastomeric material on the driving end thereof for retaining both magnetic and non-magnetic fasteners thereon.

A still further object of the invention is the provision of a screwdriver bit or a screwdriver which has formed on the driving end thereof a thin coating of a cured elastomer.

These and other objects and advantages of the present invention will be apparent from the following description, the accompanying drawings and the appended claims.

BRIEF DESCRIPTION OF THE DRAWINGS

FIG. 1 is a side view of a bit constructed according to this invention;

FIG. 2 is a sectional end view looking generally along the line 2—2 of FIG. 1;

FIG. 3 is an enlarged fragmentary transverse section through two of the driving wings, showing the relation of the coating thereon, taken generally along the line 3—3 of FIG. 4;

FIG. 4 is a fragmentary longitudinal section taken generally along the line 4—4 of FIG. 2;

FIG. 5 is a plan view of a cruciform slotted fastener head showing the driver of this invention in cross-section as inserted therein, and as taken generally along the line 5—5 of FIG. 6;

FIG. 6 is a fragmentary vertical section, with a portion of the screw head being broken away, with the sectional portion taken generally along the line 6—6 of FIG. 5;

FIG. 7 is a view similar to FIG. 1 showing a modification;

FIG. 8 is a sectional view similar to FIG. 2 and taken along the line 8—8 of FIG. 7;

FIG. 9 shows the modified bit of FIGS. 7 and 8 being inserted within a die prior to or during curing; and FIG. 10 is a diagram illustrating the method of coating the bits of this invention.

DESCRIPTION OF PREFERRED EMBODIMENTS

The invention is shown in combination with screwdriver bits made for driving cruciform recesses of the "Phillips" type. However, the invention may be employed with similar utility to a wide variety of driving tools, including screwdrivers of the ordinary type having a single blade, as well as to drivers for recesses formed with clutch heads, socket heads, spline heads, hexagonal and square drive heads and the like. Referring first to FIGS. 1-4 a bit 10 may be a standard production drive bit formed with a hexagonal end 12 adapted to be received within a suitable holder, and a threaded fastener driving end 13, which, in the form of the tool shown, conventionally includes four generally equally spaced driving wings 14a, b, c and d separated by valleys or flutes 15a, b, c and d.

The driving end 13 of the bit 10, in the embodiment of FIGS. 1-6, is coated with a thin layer 20 of a nontacky but tough and resilient material. The layer or coating 20 is shown in the figures of the drawing as being somewhat exaggerated in thickness for the purpose of illustration. However, the actual thickness of the coating, when used on a driver bit 10, need only be in the order of .0005 to .005 average thickness, although this could vary somewhat in accordance with the tool on which the coating is applied. Where not shown in cross-section, the coated portions of the bit are illustrated with stippling for the purpose of identifying the presence of the coating and to distinguish the coating from the metal surface of the bit itself.

It is satisfactory to coat the bit, or at least the entire working end of the bit as shown in FIGS. 1-4. The coating, when applied in a liquid form tends to form somewhat more thickly in the flutes 15 than on the wings 14, as shown by the thicker portion 20a in FIG. 3. However, this is not objectionable and is even desirable since there exists a generally greater clearance at this region than the wings, when the bit is inserted within the recess of a threaded fastener.

The material used as the coating 20 is a polymer resin dissolved or suspended in a suitable solvent such as methyl ethyl ketone, xylane or polyglycol solvent or mixture thereof. The resin is of the type which adheres to metal and cures either by exposure to air, evaporation of the solvent, or by a curing agent, to form an adherent nontacky film over the surface of the bit. Materials which are particularly suitable are those non-tacky materials used as a base coat on metal for purposes of adhering a polyurethane to a metal member, e.g., epoxy resins (condensation products of bisphenol A and epichlorohydrin). Of this same type are the 1,2 polyepoxides and epoxidized synthetic rubbers. Materials commercially available are Thixon J531 and Thixon J532 of Dayton Chemical Products Labs Inc., and operates satisfactorily as adherent, non-tacky elastomer type coatings.

Adhesion can be assured by first cleaning the bits and then grit blasting the exposed surfaces thereof. Other elastomers may also be used which are generally non-adhesive or tacky in the dried or cured state, including styrene butadiene and acrylonitrile-butadiene materials, neoprene, polyethylene, polypropylene, and the like.

FIGS. 5 and 6 show the driving end of the bit 10 when applied to a conforming recess in a head 25 of a threaded fastener 26. It will be seen that the surface coating 20 substantially fills the voids between the recess and the bit. The coated bit is thus proportioned to form an interference fit with the head 25, resulting in a slight deformation of portions of the coating 20, as shown in somewhat exaggereated form in FIG. 6, providing mechanical adhesion of the fastener 26 on the end of the bit. This adhesion is sufficient to support the weight of the fastener and to hold the fastener in desired coaxial alignment prior to driving. The fastener may thus be simply inserted onto the end of the bit and similarly may be easily removed, the cohesive gripping force being easily overcome.

A slightly modified form of the invention is shown in FIG. 7 in which like parts are identified by like reference numerals. In FIG. 7, special provision has been made to prevent the coating from being applied to the radial faces 30 of the wings 14. In some instances, it may be desired to prevent any substantial build up of coating on these faces or areas so as to permit any possibility of full and unobstructed insertion of the bit into the recess. For this purpose, a die 31, in FIG. 9, may be employed into which the nose of the bit is inserted prior to and/or during the settling or curing of the elastomer. The die 31 is formed with inside surfaces 32 which conform to the outer bit surfaces 30 and effectively prevent a build up of material 20 on these surfaces during settling and curing of the material.

FIG. 10 diagrammatically illustrates one suitable manner in which the elastomer-type coating may be applied to the bit. The individual bits 10 may be loaded on any suitable fixture and then immersed or dipped into a vat 40 of the coating material 20 to coat the ends 13 thereof. When the bits 10 are removed, they are rotated in a radial sense to bring the nose upwardly so that the material will flow by gravity away from the tip or nose of the bit to prevent undue accumulation of material at the tip. The bit may also be rotated axially to distribute the material uniformly and evenly about the bit. While thus held, the material may be permitted to air set whereupon the bits are transferred to an oven in which the coating is cured. However, it is within the scope of this invention to spray, mold, or otherwise apply a suitable elastomeric material 20 to the working end of the bit.

In actual use, the coating 20 may be removed by wear from portions of the driving faces of the wings 14. Since the driving contact is usually confined to small areas of the wings, only correspondingly small portions of the coating will be removed, and the remaining coating will not change or adversely affect the normal contact of the driving wings with the recess. Further, the loss of some of the coating on the driving wings will not materially reduce the slight interference fit and the resulting gripping effect provided by the coating 20 with the recess, and thus the grip fit will remain after extended use of the bit.

It is accordingly seen that the present invention provides a simple and yet effective means by which a nonmagnetic attaching and retaining force may be obtained between a tool and a fastener. Different thicknesses of the coating 20 and different materials may be employed, within the scope of the invention, provided that the material when dried or cured is not substantially tacky at the surface so as to collect dirt and other foreign substances. Preferably, the material while being somewhat resilient and elastomeric, is preferably smooth at the surface and exhibits a reasonably hard enamel-like finish, and yet is sufficiently resilient so as to provide a gripping force when inserted within a recess of a fastener.

While the forms of apparatus herein described constitute preferred embodiments of the invention, it is to be understood that the invention is not limited to these precise forms of apparatus, and that changes may be made therein without departing from the scope of the invention.

What is claimed is:

1. A driving tool for driving threaded fasteners having drive recesses, said tool having a plurality of fastener engaging drive surfaces comprising a coating of non-tacky elastomeric material bonded on at least one of said surfaces and proportioned to form an interference fit with the walls of such fastener recess for retaining such fastener in driven relation thereon.

2. In a driving tool of the type having a driving head adapted to be received in the recess of a threaded fastener, the improvement for retaining such fastener in driven relation on said head comprising a thin, dry non-tacky elastomeric material bonded to at least a portion of said driving head and proportioned to form an interference fit when such head is inserted in such recess.

3. The tool of claim 2 comprising a screwdriver bit in which said material is coated on the driving end of said bit.

4. The tool of claim 3 in which said material fully covers the driving end of said bit.

5. The tool of claim 3 in which said material is applied only to selected portions of the driving end of said bit.

6. The tool of claim 2 in which said material is a cured polymer resin which is adherent to metal.

References Cited

Greenbaum, W.: Screw Holder, in "Radio and Television," p. 594, February 1940.

ROBERT C. RIORDON, Primary Examiner

M. KOCZO, Jr., Assistant Examiner

U.S. Cl. X.R.

279—102; 287—126